US012809703B2

(12) United States Patent
Solomon

(10) Patent No.: US 12,809,703 B2
(45) **Date of Patent: *Nov. 24, 2026**

(54) DETECTION AND RECOVERY FROM AN ERROR CONDITION ON A SERIAL DATA BUS

(71) Applicant: MICROCHIP TECHNOLOGY INCORPORATED, Chandler, AZ (US)

(72) Inventor: Robin Jonah Solomon, Tamil Nadu (IN)

(73) Assignee: Microchip Technology Incorporated, Chandler, AZ (US)

( * ) Notice: Subject to any disclaimer, the term of this patent is extended or adjusted under 35 U.S.C. 154(b) by 279 days.

This patent is subject to a terminal disclaimer.

(21) Appl. No.: 18/514,759

(22) Filed: Nov. 20, 2023

(65) Prior Publication Data

US 2024/0419524 A1 Dec. 19, 2024

(30) Foreign Application Priority Data

Jun. 16, 2023 (IN) ............................. 202341041195

(51) Int. Cl.
*G06F 11/00* (2006.01)
*G06F 11/07* (2006.01)
*G06F 13/42* (2006.01)

(52) U.S. Cl.
CPC ...... *G06F 11/0751* (2013.01); *G06F 11/0745* (2013.01); *G06F 13/4282* (2013.01)

(58) Field of Classification Search
CPC ............. G06F 11/0751; G06F 11/0745; G06F 11/0793; G06F 11/1608; G06F 11/1625
See application file for complete search history.

(56) References Cited

U.S. PATENT DOCUMENTS

| | | | | |
|---|---|---|---|---|
| 6,728,908 | B1 * | 4/2004 | Fukuhara | H04L 1/0061 714/48 |
| 2004/0267999 | A1 | 12/2004 | Larson et al. | |
| 2009/0157931 | A1 | 6/2009 | Hayashita | |
| 2015/0058660 | A1 | 2/2015 | Baker | |
| 2019/0227896 | A1 | 7/2019 | Scherr | |
| 2023/0031600 | A1 | 2/2023 | Monroe | |

OTHER PUBLICATIONS

Microchip Technology, Microchip Data Sheet, 2009, https://ww1.microchip.com/, 438 pages (Year: 2009).*

(Continued)

*Primary Examiner* — Katherine Lin
(74) *Attorney, Agent, or Firm* — Shumaker, Loop & Kendrick, LLP; Ryan M. Corbett; Andrew P. Stevens

(57) ABSTRACT

A target is provided that includes a serial data (SDA) line interface to connect the target to a SDA line of a two-wire, shared, serial data bus. The target includes processing circuitry to transfer output data on to the SDA line, and monitor data on the SDA line. The processing circuitry compares the data on the SDA line and the output data to detect an error condition when the data on the SDA line and the output data differ. And the processing circuitry performs at least one operation to recover from the detected error condition, including at least one of disabling an output SDA pad buffer of the target that transfers the output data on to the SDA line, or asserting a stop condition on the data bus.

20 Claims, 7 Drawing Sheets

(56) References Cited

OTHER PUBLICATIONS

"Specification for 13C", MIPI Alliance, Inc., Version 1.1.1, including Errata 01 and Errata 02, Mar. 2022, pp. 1-576.
"Management Component Transport Protocol (MCTP) 13C Transport Binding Specification", DMTF, 2021, pp. 1-33.
International Preliminary Report on Patentability issued on Dec. 11, 2025, in corresponding International Application No. PCT/US2024/033959 (9 pages).

* cited by examiner

DETECTION AND RECOVERY FROM AN ERROR CONDITION ON A SERIAL DATA BUS

CROSS-REFERENCE TO RELATED APPLICATION(S)

The present application claims priority to Indian Provisional Patent Application No. 20/234,1041195, entitled: Detection and Recovery from a Read-Write Data Conflict on a Serial Data Bus, filed on Jun. 16, 2023, the content of which is hereby incorporated by reference in its entirety.

TECHNOLOGICAL FIELD

The present disclosure relates generally to serial communication and, in particular, to detection and recovery from an error condition on a serial data bus.

BACKGROUND

Serial communication has played a significant role in facilitating inter-chip communication within electronic systems. It involves the transmission of data sequentially, bit by bit, over a communication link between devices. This approach offers advantages such as simplicity, low pin count, and the ability to transmit data over longer distances compared to parallel communication.

One popular serial communication protocol is I2C (Inter-Integrated Circuit), which was developed by Philips Semiconductor (now NXP Semiconductors) in the early 1980s. I2C is a two-wire bus protocol that allows multiple devices to communicate with each other using a shared serial data (SDA) line and serial clock (SCL) line. It supports a controller-target (master-slave) architecture where a controller device initiates and controls communication, and target devices respond to the controller's commands or requests. I2C is commonly used for connecting various devices in embedded systems, consumer electronics, and computer peripherals.

As technology advanced and the need for higher data transfer rates, increased flexibility, and improved power efficiency emerged, the MIPI Alliance developed I3C (Improved Inter-Integrated Circuit). Introduced in 2017, 13C builds upon the strengths of I2C while offering enhancements and additional features. I3C is backward compatible with I2C, allowing I2C devices to coexist on the same data bus. It introduces higher data transfer rates, increased flexibility for connecting multiple devices, multi-controller support, hot-join capability, dynamic address assignment, in-band interrupts, and other improvements. I3C has gained popularity in applications such as smartphones, tablets, Internet of Things (IoT) devices, and automotive systems.

Serial communication protocols like I2C and I3C have become integral to inter-chip communication within electronic systems. They enable devices to exchange data, commands, and control signals efficiently and reliably. These protocols have been widely adopted and standardized, allowing for interoperability between devices from different manufacturers and simplifying the integration of various components within electronic systems. The continued evolution and development of serial communication protocols contribute to the advancement of inter-chip communication and the seamless operation of modern electronic devices.

BRIEF SUMMARY

In I3C, a controller may request a read transaction or a write transaction with a target; in some examples, however, an error may occur when the target believes it is responding to a read transaction, when the controller actually attempted to initiate a write transaction. When this occurs, the write data on the data bus from the controller might conflict with the read data from the target. In I3C, this is referred to as an error type TE6, and the target should stop the transmission, allow the controller to finish the transfer of data, and then wait for a stop or restart condition. It may take several bytes, however, before the stop/restart condition appears.

Example implementations of the present disclosure therefore relate to detection and recovery from a TE6 error condition, which may be completed sooner than as specified in I3C. The present disclosure includes, without limitation, the following example implementations.

Some example implementations provide a target comprising: a serial data (SDA) line interface to connect the target to a SDA line of a two-wire, shared, serial data bus; and processing circuitry to at least: transfer output data on to the SDA line; monitor data on the SDA line; compare the monitored data on the SDA line and the output data to detect an error condition when the monitored data on the SDA line and the output data differ; and perform at least one operation to recover from the detected error condition, including the processing circuitry to at least one of disable an output SDA pad buffer of the target that transfers the output data on to the SDA line, or assert a stop condition on the data bus.

Some example implementations provide a method comprising: transferring output data on to a serial data (SDA) line of a two-wire, shared, serial data bus; monitoring data on the SDA line; comparing the monitored data on the SDA line and the output data to detect an error condition when the monitored data on the SDA line and the output data differ; and performing at least one operation to recover from the detected error condition, including at least one of disabling an output SDA pad buffer of the target that transfers the output data on to the SDA line, or asserting a stop condition on the data bus.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
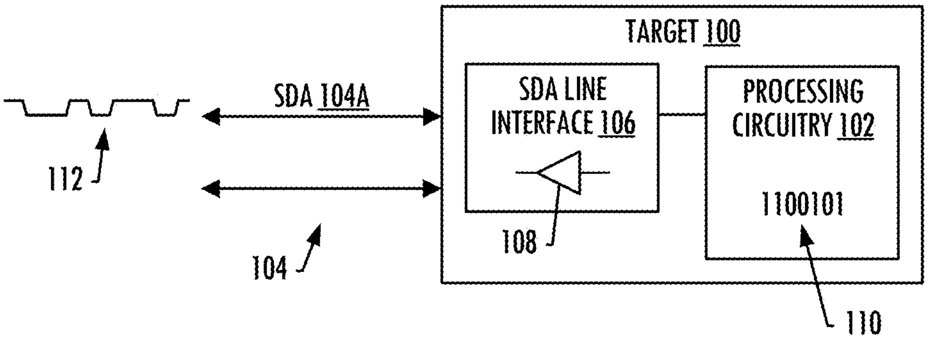
FIG. 1 illustrates a target according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Further, reference may be made herein to terms specific to a particular system or architecture, but it should be understood that example implementations of the present disclosure may be equally applicable to any of a number of systems and architectures. In this regard, some example implementations may be described in the context of serial communication standards for inter-chip communication such as I3C and its predecessor, I2C. It should be understood, however, that example implementations may be equally applicable to other serial communication standards.

Example implementations of the present disclosure relate generally to serial communication and, in particular, to detection and recovery from read-write data conflict on a serial data bus.

FIG. 1 illustrates a target 100 according to some example implementations of the present disclosure. The target may be an electronic device, such as an integrated circuit (IC). The target includes processing circuitry 102, such as a general or specific-purpose processor, microprocessor, controller, or microcontroller, without limitation. The target may also include one or more interfaces to connect the target to a data bus 104 over which the target may communicate with other electronic devices. In the context of serial communication standards such as I2C and I3C, the data bus may be a two-wire, shared, serial data bus 104. In this regard, the data bus may include a serial data (SDA) line 104A used for transmitting and receiving data between electronic devices connected to the data bus. The target may include an SDA line interface 106 to connect the target to the SDA line, and the SDA line interface may include an output SDA pad buffer 108 to drive output data 110 on the SDA line.

Figure 2:
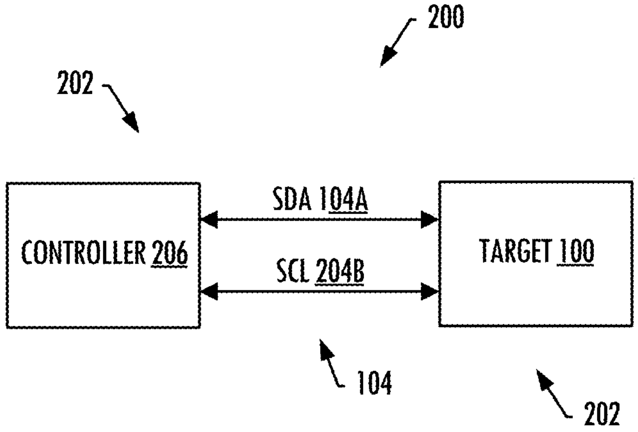
FIG. 2 illustrates a system including the target of FIG. 1, according to some example implementations.

FIG. 2 illustrates a system 200 that includes the target 100, according to some example implementations of the present disclosure. As shown, the system includes a number of electronic devices 202 such as ICs that are connected to the data bus 104. In addition to the SDA line 104A, the data bus may include a SCL line 204B that provides a clock signal used to synchronize data transfer between the electronic devices 202. In some examples, then, the target 100 may also include a SCL line interface to connect the target to the SCL line.

The system 200 may operate according to a controller-target architecture in which an electronic device 202 may function as a controller 206 that initiates and controls communication on the data bus 104 (timing and data), and another electronic device may function as the target 100 that responds to commands or requests from the controller. In some examples, the system may support multiple controllers and targets.

Figure 3:
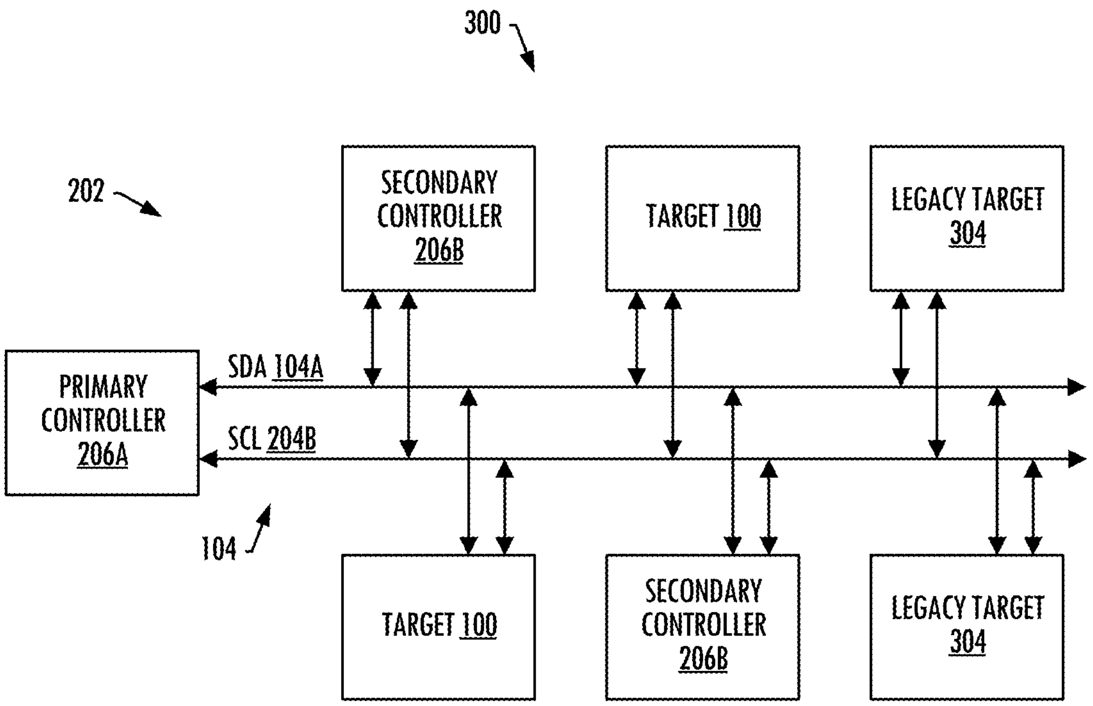
FIG. 3 illustrates a system that may correspond to the system of FIG. 2, including multiple controllers and targets, according to some example implementations.

FIG. 3 illustrates a system 300 that may correspond to the system 200 of FIG. 2, including multiple controllers and targets, according to some example implementations. As shown, for example, the system 300 may include a primary controller 206A and one or more secondary controllers 206B, any one of which may be an active controller that is currently in control of the data bus 104. The primary controller 206A may initialize the data bus 104 and perform configuration of targets 100. The primary controller 206A may act as the authority for the data bus 104 in its initial state, and become the first active controller once the data bus is configured. The secondary controller 206B may initially function as a target, but the secondary controller 206B can accept controller-ship from the active controller and become the new active controller. In the context of I3C, the system may include a I3C primary controller and one or more I3C secondary controllers.

The system 300 may likewise include one or more targets 100. The system may also include one or more legacy targets 304 from an earlier communication standard with which the system 300 may be compatible. Again, in the context of I3C, the system may include one or more I3C targets, and the system may include one or more I2C targets.

Returning to FIG. 2, the system 200 may support multiple data transfer modes, allowing the electronic devices 202 to communicate at different speeds based on their capabilities. The modes may include a single data rate (SDR) mode and a number of high data rate (HDR) modes, with increasing data transfer rates and corresponding signal integrity requirements. The SDR mode in particular, may be used for a number of purposes, such as to perform private messaging from the controller 206 to the target 100, and to enter other modes and states (e.g., HDR modes). In the context of I3C, the SDR mode may be used to implement built-in I3C features such as common command codes (CCCs), in-band interrupt (IBI), and hot-join. The SDR mode may also be used to transition from I2C to I3C through dynamic address assignment, as well as to perform legacy I2C transactions on the data bus 104.

The electronic devices 202 may operate in various output modes to drive signals on the data bus 104. Examples of suitable modes include an open-drain mode and a push-pull mode, which define how the electronic devices 202 control the voltage levels on the SDA line 104A and the SCL line 204B. In open-drain mode, the electronic device 202 may be configured at its output as an open drain or open collector. In the open-drain mode, the electronic device 202 can pull the signal line (SDA or SCL) to a low voltage level (logic 0) by actively sinking current, but the electronic device 202 is not provided with an active element to pull the signal line to high voltage level (logic 1), instead a pull-up resistor, which may be external, may be used to pull the line to the high voltage level (logic 1). In push-pull mode, the electronic device 202 may be configured at its output as a push-pull driver. In the push-pull mode, the electronic device can actively drive both high (logic 1) and low (logic 0) voltage levels on the signal line.

Figure 4A:
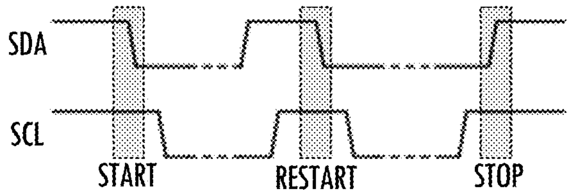
FIGS. 4A, 4B and 4C are timing diagrams of signals on lines of a data bus of the system of FIG. 2 or FIG. 3 for a transaction on the data bus, including to specify start, stop and restart conditions (FIG. 4A), an address header (FIG. 4B), and a data word (FIG. 4C), according to some example implementations.
Figure 4B:
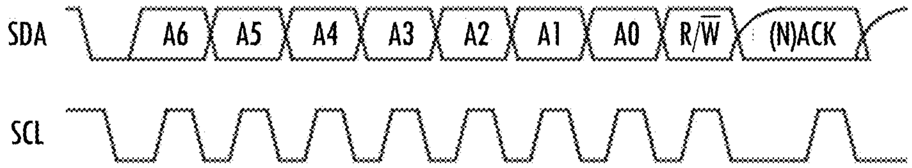
Figure 4C:
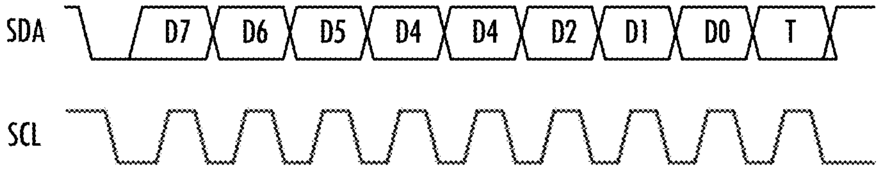

FIGS. 4A, 4B and 4C are timing diagrams of signals on the SDA line 104A and the SCL line 204B for a read/write transaction on the data bus 104, according to some example implementations. As shown in FIG. 4A, read/write transactions on the data bus may begin with a start condition, which may be asserted by the controller 206 and implemented as a high-to-low transition on the SDA line while the SCL line is maintained by the controller 206 at a constant high. Likewise, read/write transactions on the data bus may end with a stop condition asserted by the controller 206. A stop condition may be implemented as a low-to-high transition on the SDA line while the SCL is maintained at a constant high by the controller 206. As an alternative to the stop condition, a restart condition may allow multiple messages to be sent while in the same frame without needing to transmit a stop and start in between messages. A restart condition may look the same as a start condition on the data bus.

Following a start/restart condition, a read/write transaction on the data bus 104 may include an address header, which may include a destination address, indicate a read or write transaction, and provide an acknowledgement. The address header may be transmitted on the SDA line 104A during periods when the SCL line 204B is transitioning from low to high (rising edge) or from high to low (falling edge). FIG. 4B is a timing diagram of the SDA line and the SCL line for an address header (in push-pull mode), according to some example implementations. In the context of I2C and I3C, the address header may include seven address bits, one read/write (R/W) bit, and one acknowledge (ACK)/non-acknowledge (NACK) bit. In the context of I3C, the R/W bit may be referred to as a R/$\overline{W}$ bit or a RnW bit. In some examples, the controller 206 may transmit the address and R/W bits. The controller 206 may use the address bits to address the target 100, and the controller may use the R/W bit to specify a write mode (the controller 206 writing data to the target 100) or a read mode (the controller 206 reading data from the target 100). In this regard, the controller 206 may transmit a low signal on SDA line 104A (R/W bit=0) to represent the write mode, or a high signal on SDA line (R/W bit=1) to represent the read mode.

Once the controller 206 transmits the address and R/W bits of the address header on the data bus 104, the controller may wait for the target 100 to acknowledge (or not acknowledge) the request. This may be done through the ACK/NACK bit in the address header. The target may pull the SDA line 104A low (ACK/NACK bit=0) to respond with an acknowledge (ACK), or release the SDA line high (ACK/NACK bit=1) to respond with a non-acknowledge (NACK).

One or more data words may follow the address header, as shown in FIG. 4C. Similar to the address header, the data words may be transmitted on the SDA line 104A during periods when the SCL line 204B is transitioning from low to high (rising edge) or from high to low (falling edge). In the context of I3C, a data word may be nine bits wide, including eight-bit data and a ninth, transition bit (T-bit). When the controller 206 is writing data to the target 100, the T-bit of each data word may be a parity bit calculated using odd parity, which is helpful in detecting noise-caused errors on the data bus 104. Conversely, when the controller 206 is reading data returned from the target 100, the T-bit of each data word may represent an end-of-data bit. In this regard, the target 100 may use the T-bit to control the number of data words the target returns. The T-bit may also let the controller 206 prematurely abort the read. To end the message, the target 100 may return the T-bit as ‘0’. To continue the message, the target may return the T-bit as ‘1’ and monitor the SDA line. If the SDA line remains high on the next falling SCL edge, the target may continue to send the next data value. If the SDA line is low on the next falling SCL edge (restart), then the controller 206 has aborted the data transfer, and the target does not send the next data.

The electronic devices 202 may implement one or more error detection and recovery methods to handle various error conditions during read/write transactions on the data bus 104. In this regard, in the context of I3C, if an error occurs in the R/W bit of the address header, the target 100 might believe that it is responding to a read transaction, when the controller 206 actually attempted to initiate a write transaction. When this occurs, the write data on the data bus from the controller might conflict with the read data from the target. In the *MIPI I3C® Specification*, published by the Mobile Industry Processor Interface (MIPI) Alliance, this error condition is referred to as error type TE6. As specified, the target 100 should monitor data the target 100 transmits on the SDA line 104A of the data bus 104 for read transactions, which allows the target 100 to detect a TE6 error condition when the monitored data differs from the data the target intended to transmit.

According to *MIPI I3C® Specification*, when the target 100 detects a TE6 error condition during an attempted private write transaction with the controller 206 (i.e., when the target 100 acts as it is responding to a private read transaction while the controller has attempted to perform a private write transaction), the target 100 may stop the transmission, allow the controller 206 to finish the transfer of data, and then wait for a stop or restart condition. It may take several bytes, however, before the stop/restart condition appears on the SDA line 104A, in some cases up to 68 bytes. Example implementations of the present disclosure therefore provide an improved error detection and recovery method for a TE6 error condition, which may avoid prolonged conflicting data on the data bus 104, and reduce power consumption.

According to some example implementations of the present disclosure, the target 100 (e.g., processing circuitry 102) may operate in a read state to execute a read transaction to transfer output data 110 on to the data bus 104. When the target is in the read state, the target may monitor data on the SDA line 104A, compare the data on the SDA line 104A with the output data 110, and detect an error condition when the data on the SDA line 104A and the output data 110 differ. To recover from the error condition, then, the target may disable the internal, output SDA pad buffer 108 that drives the output data 110 on the SDA line, until a stop/restart condition appears on the SDA line, indicating that transfer of the data from the controller 206, which is competing with, and interfering with, the output data 110, is complete. Additionally or alternatively, in some examples, the target 100 may assert a stop on the data bus 104, which the controller 206 may detect and end transfer from the controller 206 on to the SDA line.

As shown in FIG. 1, for example, the processing circuitry 102 of the target 100 may transfer output data 110 on to the SDA line 104A, and monitor data 112 on the SDA line. In some examples, the processing circuitry 102 may filter out noise in the data on the SDA line to produce filtered data, and the monitored data may be the filtered data. In some examples, the processing circuitry 102 may detect an address header (FIG. 4B) in the data on the SDA line, and monitor one or more data words (FIG. 4C) that follow the address header in the data on the SDA line.

The processing circuitry 102 may compare the data 112 on the SDA line 104A and the output data 110 to detect an error condition when the data on the SDA line and the output data 110 differ. In some examples, the processing circuitry may perform a bitwise comparison of one or more data words of the data 112 on the SDA line, and one or more data words of the output data 110. The processing circuitry may set a flag to indicate the detected error condition is detected when the bitwise comparison indicates that the one or more data words of the data 112 on the SDA line and the one or more data words of the output data 110 differ.

The processing circuitry 102 may perform at least one operation to recover from the detected error condition, such as when the flag is set. In this regard, the processing circuitry may disable the output SDA pad buffer 108 of the target 100 that transfers the output data 110 on to the SDA line 104A. In this regard, in some examples, the output SDA pad buffer 108 is a three-state buffer with an enable/disable input via which the output SDA pad buffer 108 is disabled.

In addition to or in lieu of disabling the SDA pad buffer 108, in some examples, the processing circuitry 102 may assert a stop condition on the data bus 104. In some examples in which the data 112 on the SDA line 104A is corrupted by a controller 206 competing with, and interfering with, the output data 110, the processing circuitry 102 may assert the stop condition on the data bus 104 to cause the controller 206 to end transfer of the data on to the SDA line 104A. In some examples, the processing circuitry 102 may count bit positions of a current data word of the output data 110 to identify a transition-bit position of the current data word of the output data 102. The processing circuitry 102 may then assert the stop condition on the data bus when the transition-bit position of the current data word of the output data 110 is identified. To assert the stop condition in some examples in which the data bus 104 also includes the SCL line 204B, the processing circuitry may cause a low-to-high transition of a voltage level on the SDA line 204B, while a voltage level on the SCL line 104A is at a constant high.

Figure 5:
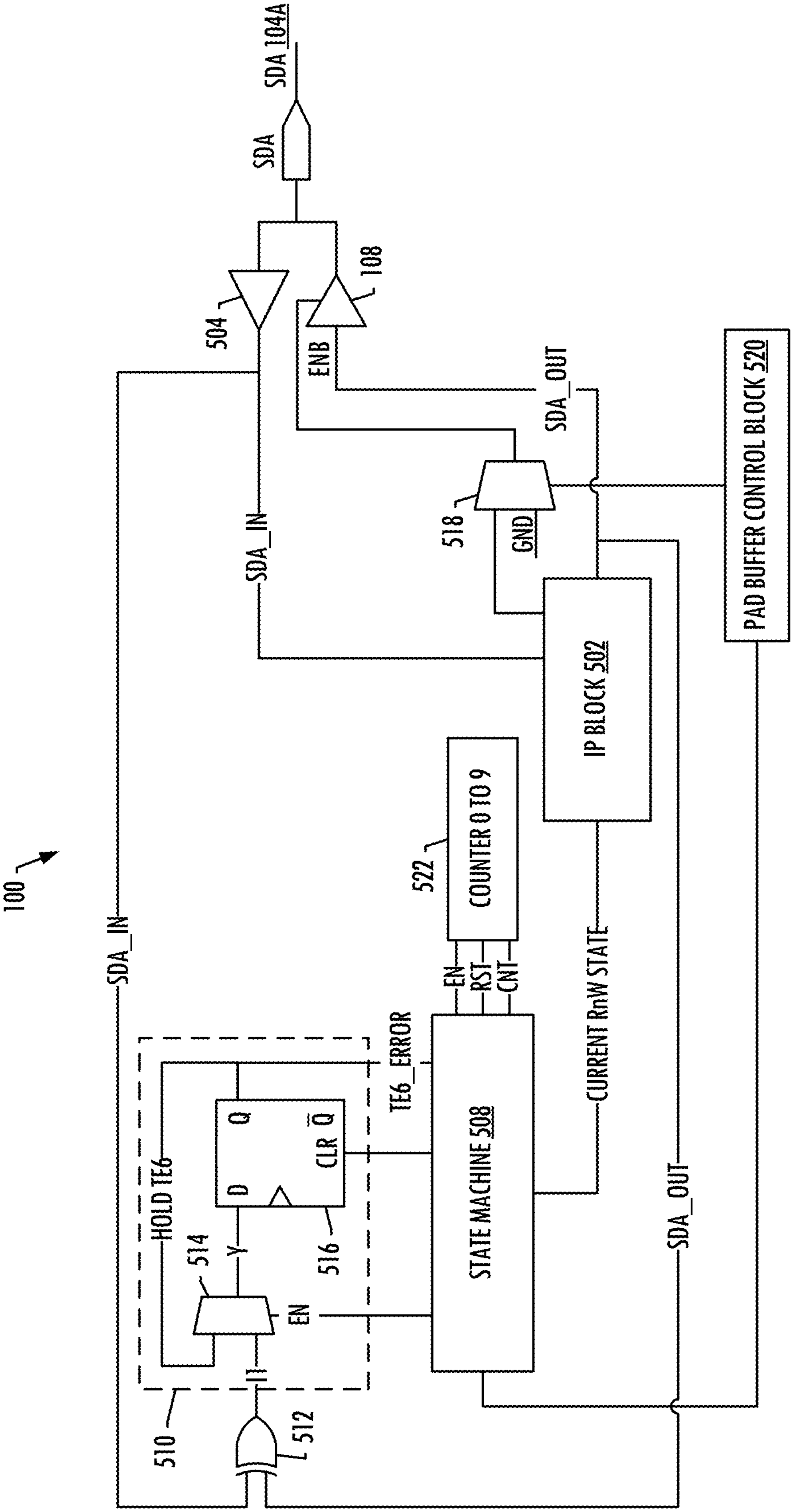
FIG. 5 is a functional block diagram of the target of FIG. 1, according to some example implementations.

To further illustrate some example implementations of the present disclosure, FIG. 5 is a functional block diagram of the target 100, according to some example implementations. In examples in which the target 100 is an electronic device 202 such as an IC, the target 100 may include a number of blocks that are functional units or modules that perform respective functions of the target 100. As shown, the target 100 may include a semiconductor intellectual property core (IP block) 502 to enable the target to support serial communication on the data bus 104. The target may include an input SDA pad buffer 504 to receive input data (SDA_IN) on the SDA line 104A. In some examples, the input SDA pad buffer 504 may include a glitch filter (sometimes referred to as a spike filter) to filter out unwanted noise in the input data on the SDA line 104A, such as by suppressing extreme changes in the voltage level on the SDA line 104A.

The target 100 may also include the output SDA pad buffer 108 to drive output data (SDA_OUT) on the SDA line 104A. In some examples, the output SDA pad buffer 108 may be a three-state buffer, and the IP block 502 may enable the output SDA pad buffer 108 to drive the output data when the target is in the read state.

As also shown, the target 100 includes a state machine 508 and a detector 510. The state machine 508 may monitor the IP block 502 to determine when the target 100 is in the read state. In the read state, the IP block 502 may cause the output SDA pad buffer 108 to drive output data (SDA_OUT) to the SDA line 104A, and thereby execute a read transaction. The state machine 508 may detect an address header in the data on the SDA line 104A (SDA_IN). The state machine 508 may then enable the detector 510 to monitor the one or more data words that follow the address header, and detect a TE6 condition on the SDA line.

In some examples, the detector 510 includes an XOR (exclusive or) gate 512, multiplexer 514 and D flip-flop 516. The XOR gate 512 may bitwise compare one or more data words of the data on the SDA line 104A (SDA_IN), and one or more output data words of the output data (SDA_OUT), and produce a high gate output (logic 1) when the one or more input data words and the one or more output data words differ. The multiplexer 514, responsive to an asserted enable signal (EN) from state machine 508, may pass the output of XOR gate 512 to the D input of D flip-flop 516, which D flip-flop 516 is clocked by a signal which may be the SCL clock, a synchronized SCL clock, or a faster clock signal, and the D flip-flop may then latch the output of XOR gate 512. In the event that the one or more input data words and the one or more output data words differ, the D flip-flop will thus latch the high output as a TE6_Error signal, (referred to at times as a TE6 error flag), which TE6_Error signal may be provided to state machine 508, to indicate a TE6 condition is encountered. Responsive to the set TE6 error flag, state machine 508 may de-assert the enable signal to multiplexer 514, thereby latching in the TE6 error flag. In other examples, multiplexer 514 and D flip-flop 516 are not required, and state machine 508 responds to the TE6 error flag without requiring that the TE6 error flag be latched. Similarly, the state machine 508 may clear the D flip-flop and thereby the clear the TE6 error flag when the detector is not in use or the target exits the read state.

The state machine 508 may detect the TE6 error flag is set, and implement a recovery method to recover. In some examples, the target 100 includes a 2:1 multiplexer 518 and a pad buffer control block 520. The 2:1 multiplexer 518 may include an output line coupled to an enable pin of the output SDA pad buffer 108, and a first input line coupled to a respective output of the IP block 502 to allow the IP block 502 to enable the output SDA pad buffer when the target is in the read state.

The 2:1 multiplexer 518 may also include a second input line coupled to ground (logic 0), and a select line coupled to the pad buffer control block 520 to allow the pad buffer control block to select one of the first or second input lines of the 2:1 multiplexer 518. The pad buffer control block 520 may select the first input line to allow the IP block 502 to enable the output SDA pad buffer 108 in the read state. When the state machine detects the TE6 error flag, however, the state machine 508 may control the pad buffer control block to select the second input line of the 2:1 multiplexer, and thereby connect the enable pin of the output SDA pad buffer to ground to disable the output SDA pad. The state machine 508 and detector 510 may therefore detect the TE6 error condition and implement a recovery method, external to and without disruption to the IP block 502.

In some examples, the target 100 may include a counter block 522 coupled to the state machine 508. In some of these examples, the state machine may use the counter block to count bit positions of the one or more output data words of the output data (SDA_OUT). The state machine may identify the T-bit position of a current one of the one or more output data words when the output SDA pad buffer 108 is disabled. The state machine may cause the target to issue a stop on the SDA line 104A and the SCL line 204B, which the controller 206 may detect and end transfer of the data on to the SDA line which data was competing with, and interfering with, the output data 110. The state machine 508 may then assert the enable signal to multiplexer 514, clear the D flip-flop 516, and signal the pad buffer control block 520 to again select the first input of the 2:1 multiplexer 518 to again allow the IP block 502 to enable the output SDA pad buffer 108. In examples in which the controller 206 does not support receipt of a stop bit generated by the target 100, and therefore the controller 206 continues to transmit data, the state machine 508 and pad buffer control block 520 may keep the output SDA pad buffer 108 disabled, and wait for a stop or restart condition from the controller 206.

Figure 6A:
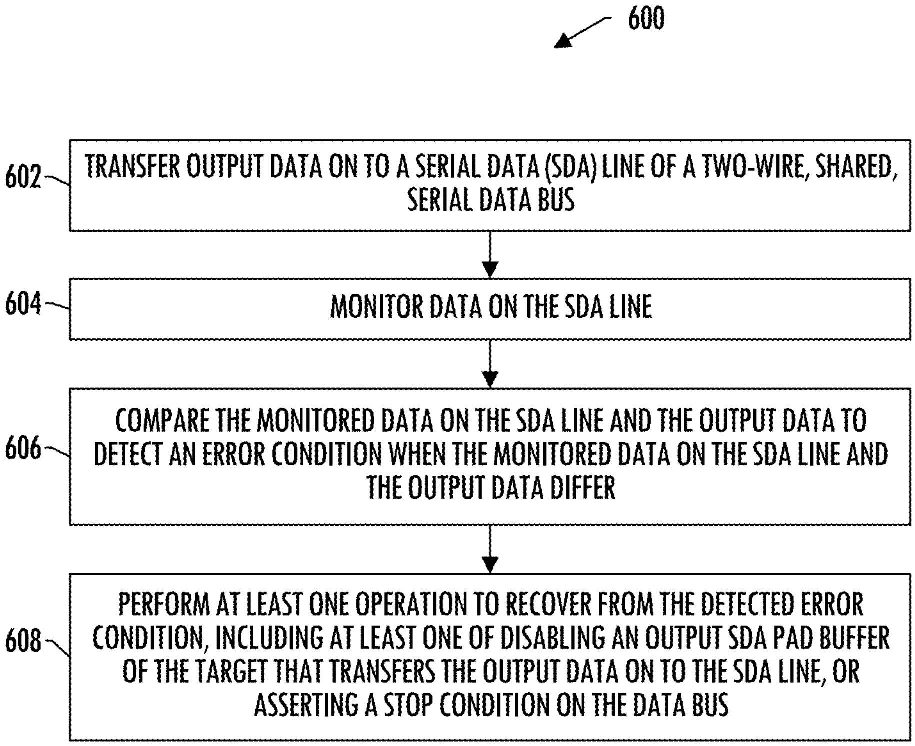
FIGS. 6A, 6B, 6C, 6D, 6E, 6F, 6G, 6H and 6I are flowcharts illustrating various steps in a method according to various example implementations.

FIGS. 6A-61 are flowcharts illustrating various steps in a method 600 according to various example implementations. The method includes transferring output data on to a serial data (SDA) line of a two-wire, shared, serial data bus, as shown at block 602 of FIG. 6A. The method includes monitoring data on the SDA line, as shown at block 604. The method includes comparing the monitored data on the SDA line and the output data to detect an error condition when the monitored data on the SDA line and the output data differ, as shown at block 606. And the method includes performing at least one operation to recover from the detected error condition, including at least one of disabling an output SDA pad buffer of the target that transfers the output data on to the SDA line, or asserting a stop condition on the data bus, as shown at block 608.

Figure 6B:
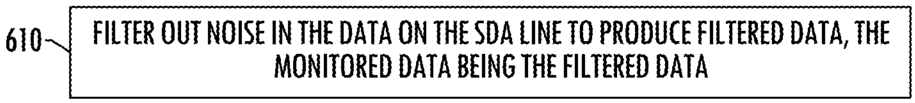

In some examples, the method 600 includes filtering out noise in the data on the SDA line to produce filtered data, as shown at block 610 of FIG. 6B. In some of these examples, the monitored data is the filtered data.

Figure 6C:
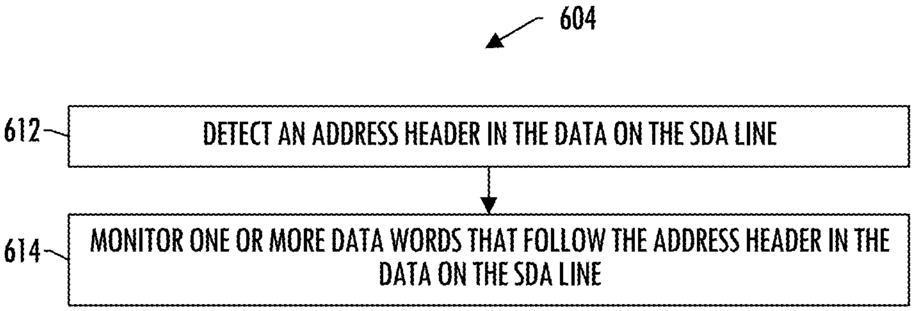

In some examples, monitoring the data on the SDA line at block 604 includes detecting an address header in the data on the SDA line, as shown at block 612 of FIG. 6C. In some of these examples monitoring the data also includes monitoring one or more data words that follow the address header in the data on the SDA line, as shown at block 614.

Figure 6D:
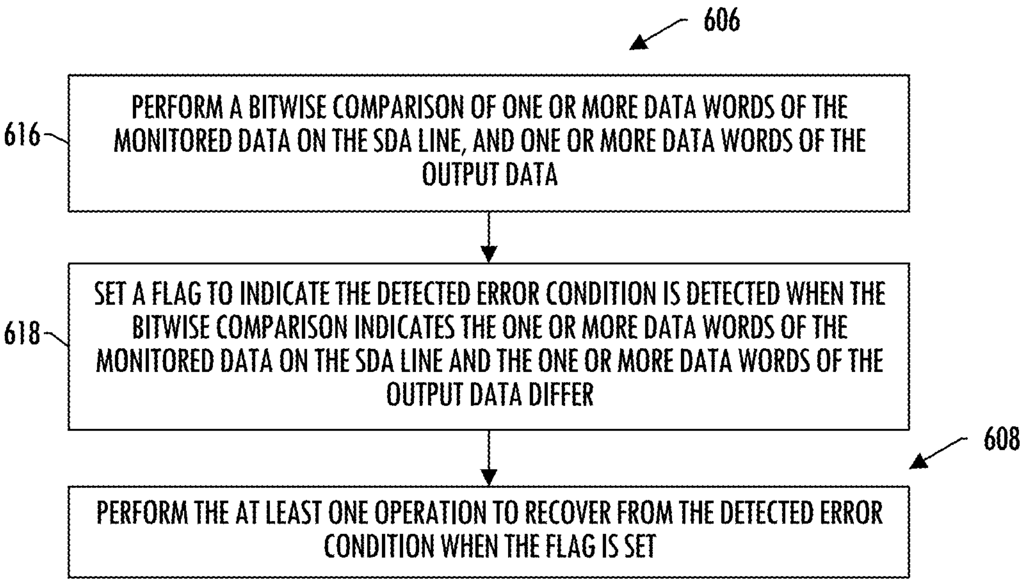

In some examples, comparing the monitored data on the SDA line and the output data at block 606 includes performing a bitwise comparison of one or more data words of the monitored data on the SDA line, and one or more data words of the output data, as shown at block 616 of FIG. 6D. In some of these examples the method 600 includes setting a flag to indicate the detected error condition is detected when the bitwise comparison indicates the one or more data words of the monitored data on the SDA line and the one or more data words of the output data differ, as shown at block 618. The at least one operation is then performed at block 608 to recover from the detected error condition when the flag is set.

Figure 6E:
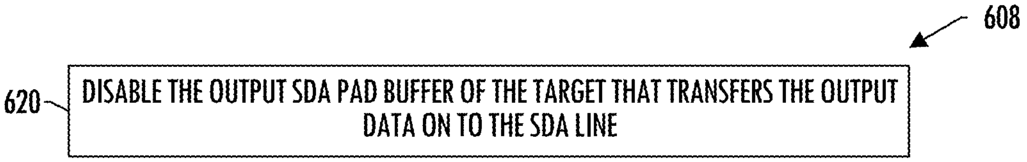

In some examples, performing the at least one operation at block 608 includes disabling the output SDA pad buffer of the target that transfers the output data on to the SDA line, as shown of at block 620 FIG. 6E.

In some examples, the output SDA pad buffer is a three-state buffer with an enable/disable input via which the output SDA pad buffer is disabled at block 620.

Figure 6F:
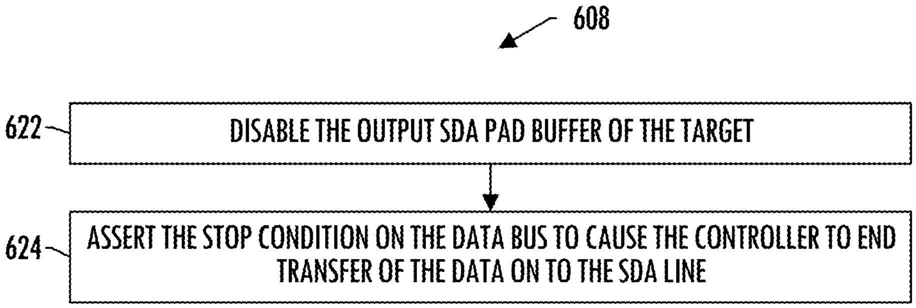

In some examples, the monitored data on the SDA line is corrupted by a controller competing with, and interfering with, the transferred output data. In some of these examples, performing the at least one operation at block 608 includes disabling the output SDA pad buffer of the target, and asserting the stop condition on the data bus to cause the controller to end transfer of the data on to the SDA line, as shown at blocks 622 and 624 of FIG. 6F.

Figure 6G:
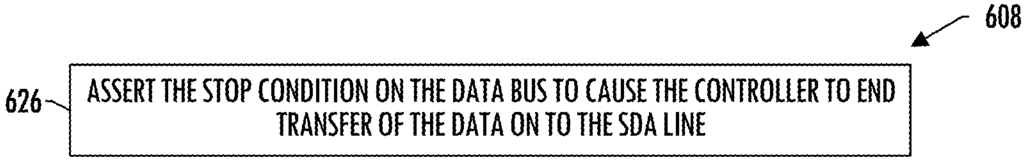

In some examples in which the data on the SDA line is corrupted by a controller competing with, and interfering with, the transferred output data, performing the at least one operation at block 608 includes asserting the stop condition on the data bus to cause the controller to end transfer of the data on to the SDA line, as shown at block 626 of FIG. 6G.

Figure 6H:
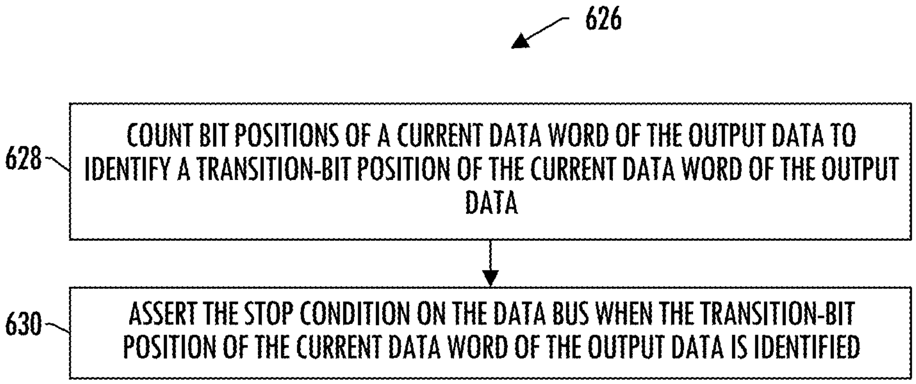

In some examples, asserting the stop condition at block 626 includes counting bit positions of a current data word of the output data to identify a transition-bit position of the current data word of the output data, as shown at block 628 of FIG. 6H. And the method includes asserting the stop condition on the data bus when the transition-bit position of the current data word of the output data is identified, as shown at block 630.

Figure 6I:
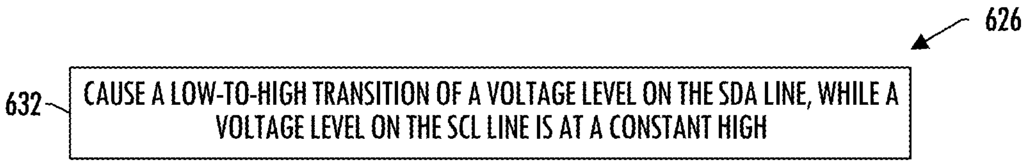

In some examples, the data bus includes the SDA line and a serial clock (SCL) line. In some of these examples, asserting the stop condition on the data bus at block 626 includes causing a low-to-high transition of a voltage level on the SDA line, while a voltage level on the SCL line is at a constant high, as shown at block 632 of FIG. 6I.

As explained above and reiterated below, the present disclosure includes, without limitation, the following example implementations.

Clause 1. A target comprising: a serial data (SDA) line interface to connect the target to a SDA line of a two-wire, shared, serial data bus; and processing circuitry to at least: transfer output data on to the SDA line; monitor data on the SDA line; compare the monitored data on the SDA line and the output data to detect an error condition when the monitored data on the SDA line and the output data differ; and perform at least one operation to recover from the detected error condition, including the processing circuitry to at least one of disable an output SDA pad buffer of the target that transfers the output data on to the SDA line, or assert a stop condition on the data bus.

Clause 2. The target of clause 1, comprising the processing circuitry to filter out noise in the data on the SDA line to produce filtered data, and wherein the monitored data is the filtered data.

Clause 3. The target of clause 1 or clause 2, wherein the processing circuitry to monitor the data on the SDA line comprises the processing circuitry to: detect an address header in the data on the SDA line; and monitor one or more data words that follow the address header in the data on the SDA line.

Clause 4. The target of any of clauses 1 to 3, wherein the processing circuitry to compare the monitored data on the SDA line and the output data comprises the processing circuitry to: perform a bitwise comparison of one or more data words of the monitored data on the SDA line, and one or more data words of the output data; and set a flag to indicate the detected error condition is detected when the bitwise comparison indicates the one or more data words of the monitored data on the SDA line and the one or more data words of the output data differ, and wherein the at least one operation is performed to recover from the detected error condition when the flag is set.

Clause 5. The target of any of clauses 1 to 4, wherein the processing circuitry to perform the at least one operation comprises the processing circuitry to disable the output SDA pad buffer of the target that transfers the output data on to the SDA line.

Clause 6. The target of clause 5, wherein the output SDA pad buffer is a three-state buffer with an enable/disable input via which the output SDA pad buffer is disabled.

Clause 7. The target of clause 5 or clause 6, wherein the monitored data on the SDA line is corrupted by a controller competing with, and interfering with, the transferred output data, and the processing circuitry to perform the at least one operation comprises the processing circuitry to disable the output SDA pad buffer of the target, and assert the stop condition on the data bus to cause the controller to end transfer of the data on to the SDA line.

Clause 8. The target of any of clauses 1 to 7, wherein the monitored data on the SDA line is corrupted by a controller competing with, and interfering with, the transferred output data, and the processing circuitry to perform the at least one operation comprises the processing circuitry to assert the stop condition on the data bus to cause the controller to end transfer of the data on to the SDA line.

Clause 9. The target of clause 8, wherein the processing circuitry to assert the stop condition comprises the processing circuitry to: count bit positions of a current data word of the output data to identify a transition-bit position of the current data word of the output data; and assert the stop condition on the data bus when the transition-bit position of the current data word of the output data is identified.

Clause 10. The target of clause 8 or clause 9, wherein the data bus includes the SDA line and a serial clock (SCL) line; and wherein the processing circuitry to assert the stop condition on the data bus comprises the processing circuitry to cause a low-to-high transition of a voltage level on the SDA line, while a voltage level on the SCL line is at a constant high.

Clause 11. A method comprising: transferring output data on to a serial data (SDA) line of a two-wire, shared, serial data bus; monitoring data on the SDA line; comparing the monitored data on the SDA line and the output data to detect an error condition when the monitored data on the SDA line and the output data differ; and performing at least one operation to recover from the detected error condition, including at least one of disabling an output SDA pad buffer of the target that transfers the output data on to the SDA line, or asserting a stop condition on the data bus.

Clause 12. The method of clause 11, comprising filtering out noise in the data on the SDA line to produce filtered data, and wherein the monitored data is the filtered data.

Clause 13. The method of clause 11 or clause 12, wherein monitoring the data on the SDA line comprises: detecting an address header in the data on the SDA line; and monitoring one or more data words that follow the address header in the data on the SDA line.

Clause 14. The method of any of clauses 11 to 13, wherein comparing the monitored data on the SDA line and the output data comprises: performing a bitwise comparison of one or more data words of the monitored data on the SDA line, and one or more data words of the output data; and setting a flag to indicate the detected error condition is detected when the bitwise comparison indicates the one or more data words of the monitored data on the SDA line and the one or more data words of the output data differ, and wherein the at least one operation is performed to recover from the detected error condition when the flag is set.

Clause 15. The method of any of clauses 11 to 14, wherein performing the at least one operation comprises disabling the output SDA pad buffer of the target that transfers the output data on to the SDA line.

Clause 16. The method of clause 15, wherein the output SDA pad buffer is a three-state buffer with an enable/disable input via which the output SDA pad buffer is disabled.

Clause 17. The method of clause 15 or clause 16, wherein the monitored data on the SDA line is corrupted by a controller competing with, and interfering with, the transferred output data, and performing the at least one operation comprises disabling the output SDA pad buffer of the target, and asserting the stop condition on the data bus to cause the controller to end transfer of the data on to the SDA line.

Clause 18. The method of any of clauses 11 to 17, wherein the monitored data on the SDA line is corrupted by a controller competing with, and interfering with, the transferred output data, and performing the at least one operation comprises asserting the stop condition on the data bus to cause the controller to end transfer of the data on to the SDA line.

Clause 19. The method of clause 18, wherein asserting the stop condition comprises: counting bit positions of a current data word of the output data to identify a transition-bit position of the current data word of the output data; and asserting the stop condition on the data bus when the transition-bit position of the current data word of the output data is identified.

Clause 20. The method of clause 18 or clause 19, wherein the data bus includes the SDA line and a serial clock (SCL) line, and wherein asserting the stop condition on the data bus comprises causing a low-to-high transition of a voltage level on the SDA line, while a voltage level on the SCL line is at a constant high.

May modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A target comprising:
a serial data (SDA) line interface to connect the target to a SDA line of a two-wire, shared, serial data bus; and
processing circuitry to at least:
transfer output data on to the SDA line;
monitor data on the SDA line, comprising:
detect an address header in the data on the SDA line; and
monitor one or more data words that follow the address header in the data on the SDA line;
compare the monitored data on the SDA line and the output data to detect an error condition when the monitored data on the SDA line and the output data differ; and
perform at least one operation to recover from the detected error condition, including the processing circuitry to at least one of disable an output SDA pad buffer of the target that transfers the output data on to the SDA line, or assert a stop condition on the data bus.

2. The target of claim 1, comprising the processing circuitry to filter out noise in the data on the SDA line to produce filtered data, and wherein the monitored data is the filtered data.

3. The target of claim 1, wherein the processing circuitry to compare the monitored data on the SDA line and the output data comprises the processing circuitry to:
perform a bitwise comparison of one or more data words of the monitored data on the SDA line, and one or more data words of the output data; and
set a flag to indicate the detected error condition is detected when the bitwise comparison indicates the one or more data words of the monitored data on the SDA line and the one or more data words of the output data differ, and
wherein the at least one operation is performed to recover from the detected error condition when the flag is set.

4. The target of claim 1, wherein the processing circuitry to perform the at least one operation comprises the processing circuitry to disable the output SDA pad buffer of the target that transfers the output data on to the SDA line.

5. The target of claim 4, wherein the output SDA pad buffer is a three-state buffer with an enable/disable input via which the output SDA pad buffer is disabled.

6. The target of claim 4, wherein the monitored data on the SDA line is corrupted by a controller competing with, and interfering with, the transferred output data, and the processing circuitry to perform the at least one operation comprises the processing circuitry to disable the output SDA pad buffer of the target, and assert the stop condition on the data bus to cause the controller to end transfer of data from the controller on to the SDA line.

7. The target of claim 1, wherein the monitored data on the SDA line is corrupted by a controller competing with, and interfering with, the transferred output data, and the processing circuitry to perform the at least one operation comprises the processing circuitry to assert the stop condition on the data bus to cause the controller to end transfer of data from the controller on to the SDA line.

8. The target of claim 7, wherein the processing circuitry to assert the stop condition comprises the processing circuitry to:
count bit positions of a current data word of the output data to identify a transition-bit position of the current data word of the output data; and
assert the stop condition on the data bus when the transition-bit position of the current data word of the output data is identified.

9. The target of claim 7, wherein the data bus includes the SDA line and a serial clock line (SCL); and
wherein the processing circuitry to assert the stop condition on the data bus comprises the processing circuitry to cause a low-to-high transition of a voltage level on the SDA line, while a voltage level on the SCL line is at a constant high.

10. A method comprising:
transferring output data on to a serial data (SDA) line of a two-wire, shared, serial data bus;
monitoring data on the SDA line, comprising:
detecting an address header in the data on the SDA line; and
monitoring one or more data words that follow the address header in the data on the SDA line;
comparing the monitored data on the SDA line and the output data to detect an error condition when the monitored data on the SDA line and the output data differ; and
performing at least one operation to recover from the detected error condition, including at least one of disabling an output SDA pad buffer of a target that transfers the output data on to the SDA line, or asserting a stop condition on the data bus.

11. The method of claim 10, comprising filtering out noise in the data on the SDA line to produce filtered data, and wherein the monitored data is the filtered data.

12. The method of claim 10, wherein comparing the monitored data on the SDA line and the output data comprises:
performing a bitwise comparison of one or more data words of the monitored data on the SDA line, and one or more data words of the output data; and
setting a flag to indicate the detected error condition is detected when the bitwise comparison indicates the one or more data words of the monitored data on the SDA line and the one or more data words of the output data differ, and
wherein the at least one operation is performed to recover from the detected error condition when the flag is set.

13. The method of claim 10, wherein performing the at least one operation comprises disabling the output SDA pad buffer of the target that transfers the output data on to the SDA line.

14. The method of claim 13, wherein the output SDA pad buffer is a three-state buffer with an enable/disable input via which the output SDA pad buffer is disabled.

15. The method of claim 13, wherein the monitored data on the SDA line is corrupted by a controller competing with, and interfering with, the transferred output data, and performing the at least one operation comprises disabling the output SDA pad buffer of the target, and asserting the stop condition on the data bus to cause the controller to end transfer of data from the controller on to the SDA line.

16. The method of claim 10, wherein the monitored data on the SDA line is corrupted by a controller competing with, and interfering with, the transferred output data, and performing the at least one operation comprises asserting the stop condition on the data bus to cause the controller to end transfer of data from the controller on to the SDA line.

17. The method of claim 16, wherein asserting the stop condition comprises:

counting bit positions of a current data word of the output data to identify a transition-bit position of the current data word of the output data; and asserting the stop condition on the data bus when the transition-bit position of the current data word of the output data is identified.

18. The method of claim 16, wherein the data bus includes the SDA line and a serial clock line (SCL), and wherein asserting the stop condition on the data bus comprises causing a low-to-high transition of a voltage level on the SDA line, while a voltage level on the SCL line is at a constant high.

19. A target comprising:

a serial data (SDA) line interface to connect the target to a SDA line of a two-wire, shared, serial data bus; and processing circuitry to at least:

transfer output data on to the SDA line;

monitor data on the SDA line;

compare the monitored data on the SDA line and the output data to detect an error condition when the monitored data on the SDA line and the output data differ; and perform at least one operation to recover from the detected error condition, comprising the processing circuitry to disable an output SDA pad buffer of the target that transfers the output data on to the SDA line, wherein the output SDA pad buffer is a three-state buffer with an enable/disable input via which the output SDA pad buffer is disabled.

20. The target of claim 19, comprising the processing circuitry to filter out noise in the data on the SDA line to produce filtered data, and wherein the monitored data is the filtered data.

* * * * *